US 11,524,604 B2

(12) United States Patent
Hamachi et al.

(10) Patent No.: US 11,524,604 B2
(45) Date of Patent: Dec. 13, 2022

(54) FUEL CELL VEHICLE AND ACTIVATION METHOD OF FUEL CELL VEHICLE

(71) Applicant: HONDA MOTOR CO., LTD., Tokyo (JP)

(72) Inventors: Masakazu Hamachi, Wako (JP); Satoshi Tanimoto, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 150 days.

(21) Appl. No.: 17/068,161

(22) Filed: Oct. 12, 2020

(65) Prior Publication Data

US 2021/0114483 A1 Apr. 22, 2021

(30) Foreign Application Priority Data

Oct. 18, 2019 (JP) .............................. JP2019-190877

(51) Int. Cl.
| | | |
|---|---|---|
| *B60L 58/40* | (2019.01) | |
| *H01M 8/04302* | (2016.01) | |
| *H01M 8/04858* | (2016.01) | |
| *H01M 8/0432* | (2016.01) | |
| *H01M 10/44* | (2006.01) | |

(Continued)

(52) U.S. Cl.
CPC ............... *B60L 58/40* (2019.02); *B60L 50/75* (2019.02); *B60L 53/54* (2019.02); *H01M 8/0432* (2013.01); *H01M 8/0491* (2013.01); *H01M 8/0494* (2013.01); *H01M 8/04302* (2016.02); *H01M 8/04947* (2013.01); *H01M 10/443* (2013.01); *H01M 16/006* (2013.01); *H01M 2220/20* (2013.01); *H01M 2250/20* (2013.01)

(58) Field of Classification Search
CPC .......... B60L 58/40; B60L 50/75; B60L 53/54; H01M 8/04302; H01M 8/0432; H01M 8/0491; H01M 8/0494
See application file for complete search history.

(56) References Cited

U.S. PATENT DOCUMENTS

| | | | | |
|---|---|---|---|---|
| 2009/0068520 A1* | 3/2009 | Wake | ................ | H01M 8/04597 429/441 |
| 2012/0288778 A1* | 11/2012 | Kazuno | ............ | H01M 8/04753 429/432 |

(Continued)

FOREIGN PATENT DOCUMENTS

| | | | | |
|---|---|---|---|---|
| GB | 2594287 A | * | 10/2021 | ............... B60K 6/52 |
| GB | 2594289 A | * | 10/2021 | ............ B60W 10/08 |
| JP | 2015-201407 A | | 11/2015 | |

*Primary Examiner* — Rexford N Barnie
*Assistant Examiner* — Elim Ortiz
(74) *Attorney, Agent, or Firm* — Carrier Blackman & Associates, P.C.; Joseph P. Carrier; Fulchand P. Shende

(57) ABSTRACT

A fuel cell vehicle is mounted with a fuel cell system including a fuel cell stack and a battery. The fuel cell vehicle controls operation of the fuel cell system with an ECU, to perform standby power generation from activation to when travel is allowed and to perform power generation during operation of the fuel cell vehicle after travel has been allowed. In an activation method, the power generation current is increased in accordance with a low-temperature efficiency rate during the power generation during operation, the battery is charged and the power generation current is increased in accordance with a standby current increase rate that is lower than the low-temperature efficiency rate during the standby power generation.

13 Claims, 6 Drawing Sheets

(51) Int. Cl.
    *H01M 16/00*     (2006.01)
    *B60L 50/75*     (2019.01)
    *B60L 53/54*     (2019.01)

(56) References Cited

U.S. PATENT DOCUMENTS

| | | | |
|---|---|---|---|
| 2013/0063072 A1* | 3/2013 | Shirasaka | H01M 8/04753 |
| | | | 320/101 |
| 2013/0288148 A1* | 10/2013 | Kazuno | H01M 8/04619 |
| | | | 429/444 |
| 2017/0244122 A1* | 8/2017 | Hamachi | H01M 8/04828 |
| 2017/0250425 A1* | 8/2017 | Koiwa | H01M 8/04649 |
| 2018/0375119 A1* | 12/2018 | Takahashi | H01M 8/04753 |
| 2019/0198897 A1* | 6/2019 | Okamura | H01M 8/04253 |

\* cited by examiner

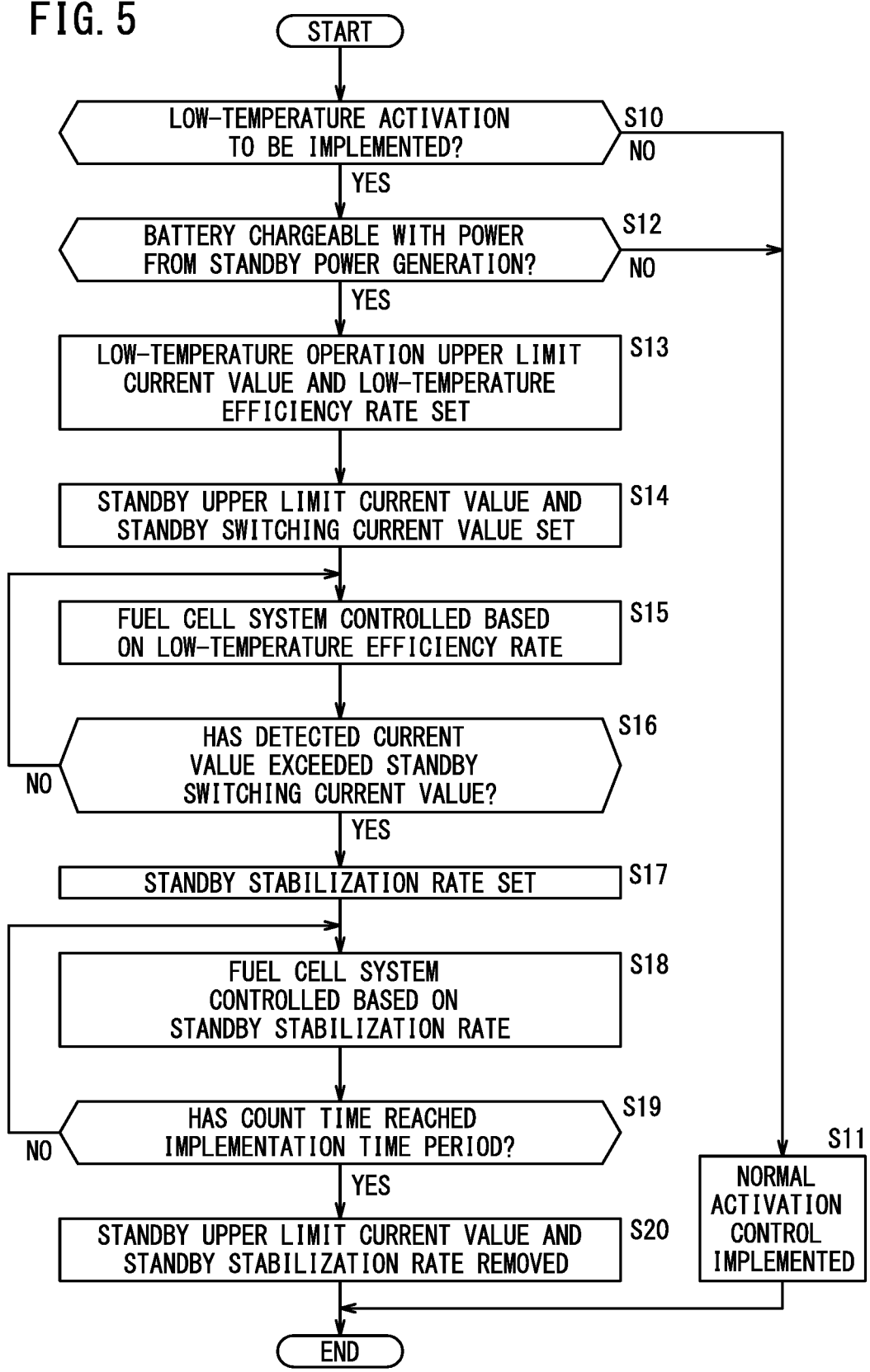

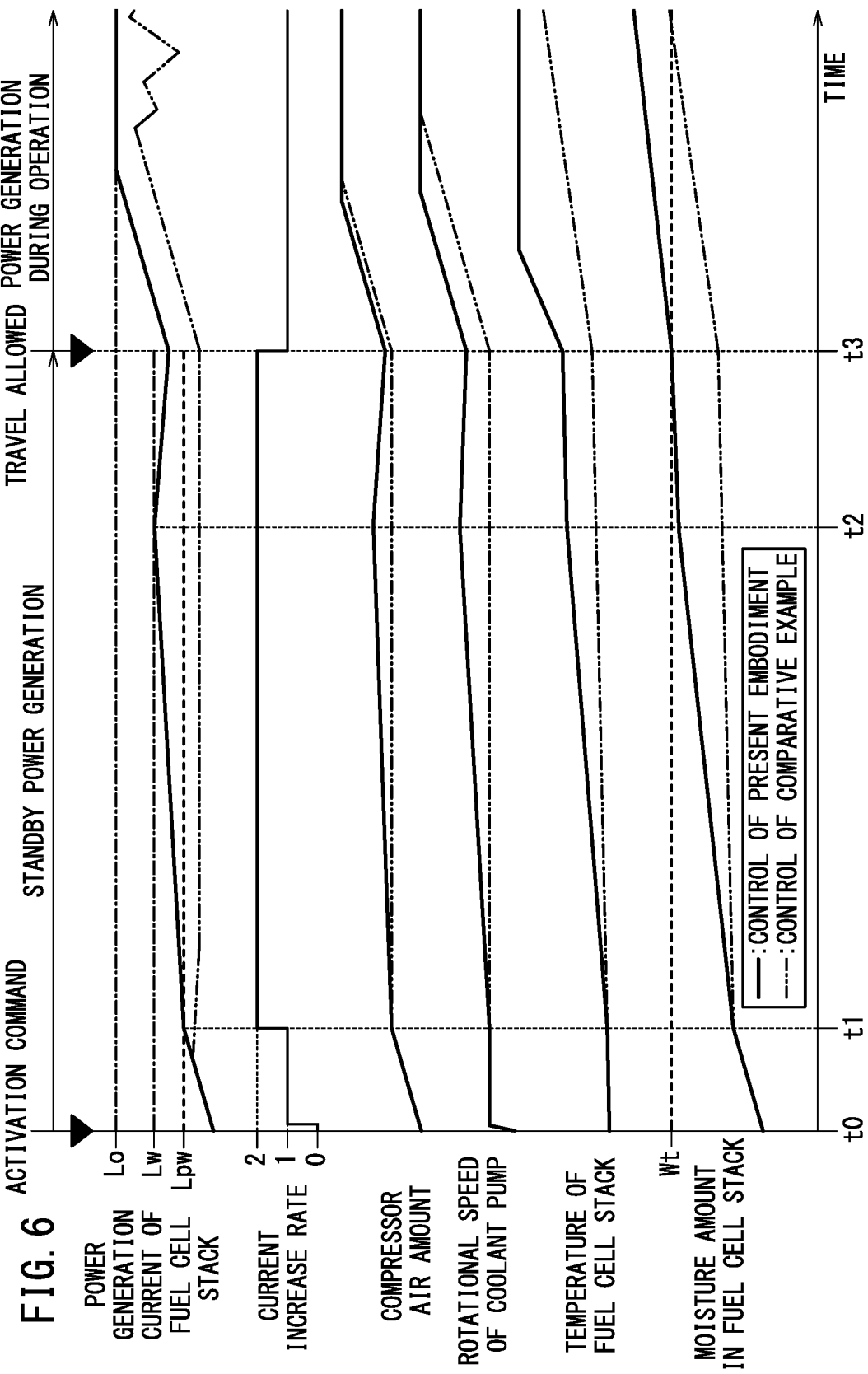

FUEL CELL VEHICLE AND ACTIVATION METHOD OF FUEL CELL VEHICLE

CROSS-REFERENCE TO RELATED APPLICATION

This application is based upon and claims the benefit of priority from Japanese Patent Application No. 2019-190877 filed on Oct. 18, 2019, the contents of which are incorporated herein by reference.

BACKGROUND OF THE INVENTION

Field of the Invention

The present invention relates to a fuel cell vehicle in which a fuel cell system is mounted, and to an activation method of a fuel cell vehicle.

Description of the Related Art

As disclosed in Japanese Laid-Open Patent Publication No. 2015-201407, a fuel cell system mounted in a fuel cell vehicle controls the power generation amount of a fuel cell stack based on a power generation demand or the like corresponding to the travel state of the fuel cell vehicle. Furthermore, the fuel cell system disclosed in Japanese Laid-Open Patent Publication No. 2015-201407 implements a current limiting process on the fuel cell when the power generation voltage of the fuel cell is lower than the voltage demanded by an external load, and then performs a process to increase the output current of the fuel cell to be less than or equal to an upper limit value.

SUMMARY OF THE INVENTION

In this type of fuel cell vehicle, when activating the fuel cell system in a state where the surrounding environment is at a low temperature (e.g. below the freezing point), warming up (standby power generation) is performed until the fuel cell stack reaches a temperature at which stable power generation is possible. During this warming up, travel manipulations by the user are not accepted, and therefore, if the standby power generation lasts a long time, the ease of use for the user decreases.

However, in order to prevent freezing inside the fuel cell stack in a case where low-temperature activation is expected, the fuel cell vehicle implements a scavenging process to reduce the moisture in the fuel cell stack. Therefore, even when the amount of reactant gas being supplied is rapidly increased and continues at the increased amount in order to shorten the standby power generation, the amount of moisture in the fuel cell stack is insufficient, and therefore the power generation of the fuel cell stack becomes unstable. Ultimately, the time-shortening of the standby power generation is insufficient, which can cause a worsening of the fuel efficiency.

The present invention has been devised taking into consideration the aforementioned problem, and has the object of providing a fuel cell vehicle and an activation method of the fuel cell vehicle, which make it possible to significantly shorten the standby time during activation while achieving power generation stability for a fuel cell system with a simple configuration.

In order to achieve the aforementioned object, a first aspect of the present invention is a fuel cell vehicle mounted with a fuel cell system including a fuel cell stack and a battery that is charged with power generated by the fuel cell stack, the fuel cell vehicle travelling using power of the fuel cell stack and the battery, and comprising a control section configured to, when a surrounding environment is at a low temperature, control operation of the fuel cell system prior to travelling, to perform standby power generation from activation to when travel is allowed and to perform power generation during operation of the fuel cell vehicle after travel has been allowed, wherein: during the power generation during operation, the control section increases a power generation current of the fuel cell stack in accordance with a first current increase rate; and during the standby power generation, the control section causes the battery to be charged with the power generated by the fuel cell stack and, when the power generation current of the fuel cell stack exceeds a standby switching current value set based on temperature information, the control section switches the first current increase rate to a second current increase rate that is a lower increase rate than the first current increase rate and increases the power generation current of the fuel cell stack in accordance with the second current increase rate.

In order to achieve the aforementioned object, a second aspect of the present invention is an activation method of a fuel cell vehicle mounted with a fuel cell system including a fuel cell stack and a battery that is charged with power generated by the fuel cell stack, the fuel cell vehicle travelling using power of the fuel cell stack and the battery, and being configured to, when a surrounding environment is at a low temperature, control operation of the fuel cell system with a control section prior to travelling, to perform standby power generation from activation to when travel is allowed and to perform power generation during operation of the fuel cell vehicle after travel has been allowed, the activation method comprising: during the power generation during operation, increasing a power generation current of the fuel cell stack in accordance with a first current increase rate; and during the standby power generation, charging the battery with the power generated by the fuel cell stack and, when the power generation current of the fuel cell stack exceeds a standby switching current value set based on temperature information, switching the first current increase rate to a second current increase rate that is a lower increase rate than the first current increase rate and increasing the power generation current of the fuel cell stack in accordance with the second current increase rate.

The fuel cell vehicle and the activation method of the fuel cell vehicle described above can significantly shorten the standby time during activation, while achieving power generation stability for the fuel cell system with a simple configuration.

The above and other objects, features, and advantages of the present invention will become more apparent from the following description when taken in conjunction with the accompanying drawings, in which a preferred embodiment of the present invention is shown by way of illustrative example.

BRIEF DESCRIPTION OF THE DRAWINGS

FIG. 5 is a flow chart showing an activation method of the fuel cell vehicle; and FIG. 6 is a time chart showing the operation during activation of the fuel cell system and the change in the power generation current.

DESCRIPTION OF THE PREFERRED EMBODIMENTS

Preferred embodiments of the present invention will be presented and described below with reference to the accompanying drawings.

Figure 1:
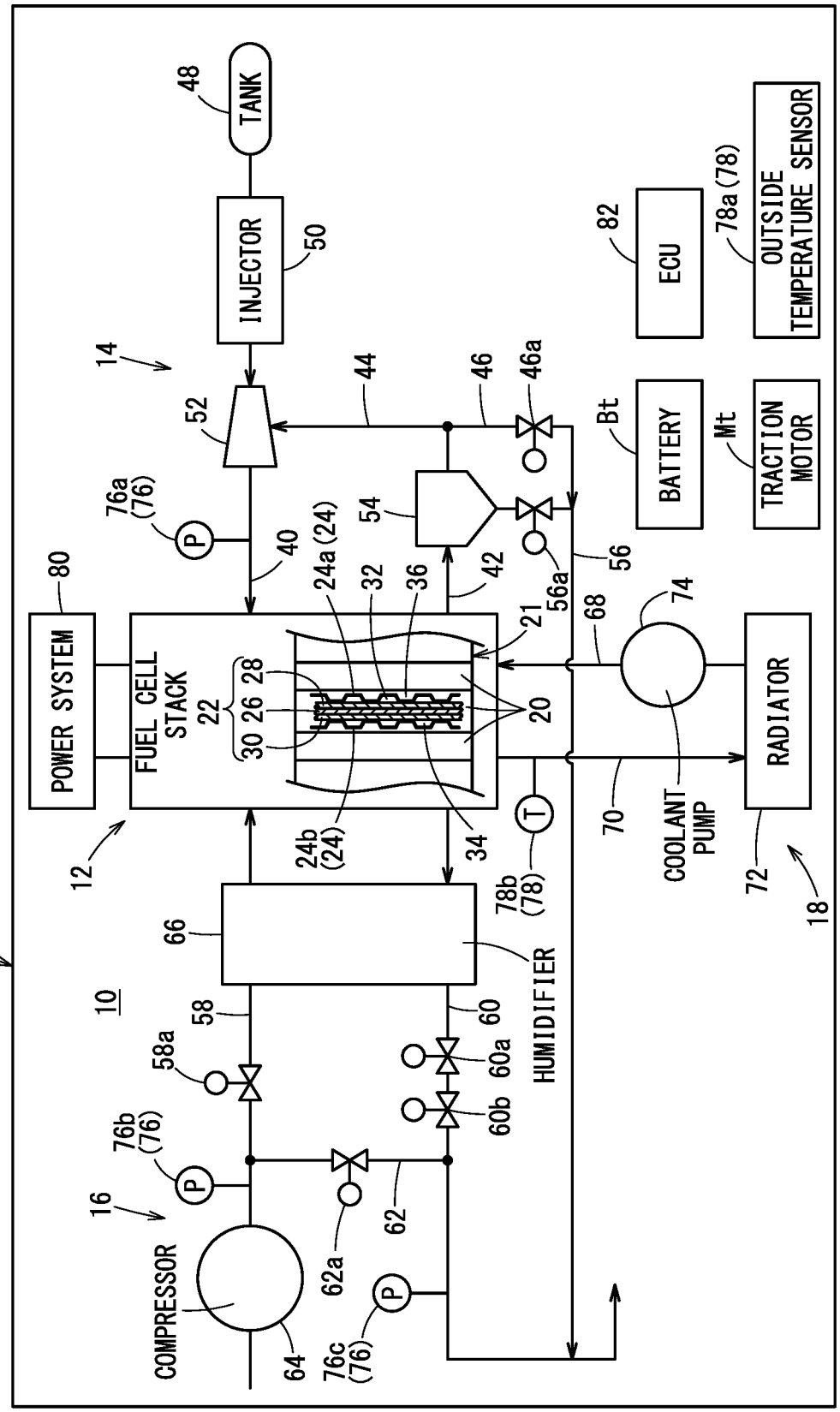
FIG. 1 is a descriptive diagram showing an overall configuration of a fuel cell vehicle according to an embodiment of the present invention.

As shown in FIG. 1, a fuel cell system 10 according to an embodiment of the present invention includes a fuel cell stack 12, an anode system apparatus 14, a cathode system apparatus 16, and a cooling apparatus 18. This fuel cell system 10 is mounted in a motor room of a fuel cell vehicle 11 (referred to as a fuel cell automobile and simply as a vehicle 11 below), and causes the vehicle 11 to travel by supplying the generated power of the fuel cell stack 12 to a battery Bt, a traction motor Mt, and the like.

The fuel cell stack 12 includes a plurality of power generation cells 20 that generate power through an electrochemical reaction between an anode gas (fuel gas such as hydrogen) and a cathode gas (oxygen-containing gas such as air). The plurality of power generation cells 20 form a stack body 21 by being stacked in a vehicle width direction with the electrode surfaces in an upright orientation, in a state where the fuel cell stack 12 is mounted in the vehicle 11. The plurality of power generation cells 20 may instead be stacked in the vehicle length direction (front-rear direction) of the vehicle 11 or in the direction of gravity.

Each power generation cell 20 is formed by a membrane electrode assembly 22 (referred to below as an "MEA 22") and a pair of separators 24 (first separator 24a and second separator 24b) sandwiching the MEA 22. The MEA 22 includes an electrolyte membrane 26 (e.g. a solid polymer electrolyte membrane (cation exchange membrane)), an anode 28 provided on one surface of the electrolyte membrane 26, and a cathode 30 provided on the other surface of the electrolyte membrane 26. The first and second separators 24a and 24b form an anode gas flow field 32 through which the anode gas is made to flow and a cathode gas flow field 34 through which the cathode gas is made to flow, on respective surfaces thereof facing the MEA 22. Furthermore, a coolant flow field 36 through which coolant is made to flow is formed on the surfaces of the first and second separators 24a and 24b facing each other, due to the stacking of the plurality of power generation cells 20.

The fuel cell stack 12 further includes a plurality of passages (anode gas passages, cathode gas passages, and coolant passages), not shown in the drawings, through which the anode gas, the cathode gas, and the coolant are respectively made to flow in the stacking direction of the stack body 21. The anode gas passages are in communication with the anode gas flow field 32, the cathode gas passages are in communication with the cathode gas flow field 34, and the coolant passages are in communication with the coolant flow field 36.

The fuel cell stack 12 is supplied with the anode gas by the anode system apparatus 14. The anode gas within the fuel cell stack 12 flows into the anode gas flow field 32 through the anode gas passage (anode gas inlet passage), and is used for power generation in the anode 28. The anode offgas (including unreacted hydrogen) that has been used for power generation flows out from the anode gas flow field 32 through the anode gas passage (anode gas outlet passage) to be discharged from the fuel cell stack 12 to the anode system apparatus 14.

The fuel cell stack 12 is supplied with the cathode gas by the cathode system apparatus 16. The cathode gas within the fuel cell stack 12 flows into the cathode gas flow field 34 through the cathode gas passage (cathode gas inlet passage), and is used for power generation in the cathode 30. The cathode offgas that has been used for power generation flows out from the cathode gas flow field 34 through the cathode gas passage (cathode gas outlet passage) to be discharged from the fuel cell stack 12 to the cathode system apparatus 16.

The fuel cell stack 12 is supplied with the coolant by the cooling apparatus 18. The coolant within the fuel cell stack 12 flows into the coolant flow field 36 through the coolant passage (coolant inlet passage), and cools the power generation cells 20. The coolant that has cooled the power generation cells 20 flows out from the coolant flow field 36 through the coolant passage (coolant outlet passage) to be discharged from the fuel cell stack 12 to the cooling apparatus 18.

The fuel cell stack 12 according to the present embodiment houses the stack body 21 inside a stack case (not shown in the drawings). A terminal plate, an insulation plate, and an end plate are arranged outward in the stated order at each end of the stack body 21 in the stacking direction. The end plates provide a tightening load in the stacking direction of the power generation cells 20.

The anode system apparatus 14 of the fuel cell system 10 includes an anode supply path 40 for supplying the anode gas to the fuel cell stack 12, and an anode discharge path 42 for discharging the anode offgas from the fuel cell stack 12. Furthermore, an anode circulation path 44 for returning the unreacted hydrogen contained in the anode offgas in the anode discharge path 42 to the anode supply path 40 is connected between the anode supply path 40 and the anode discharge path 42. Yet further, a purge path 46 for discharging the anode offgas from the circulation circuit of the anode system apparatus 14 is connected to the anode circulation path 44.

A tank 48 that stores the anode gas (high-pressure hydrogen gas) is connected to one end (upstream end) of the anode supply path 40. The tank 48 causes the anode gas to flow out to the anode supply path 40, based on the opening and closing of an in-tank electromagnetic valve (not shown in the drawings).

An injector 50 and an ejector 52, functioning as auxiliary equipment of the anode system apparatus 14, are provided in the anode supply path 40 between the tank 48 and the fuel cell stack 12. When the fuel cell system 10 operates, the injector 50 performs an opening/closing operation such that the anode gas on the upstream side (high-pressure side) of the anode supply path 40 has a prescribed pressure, and ejects the anode gas to the downstream side (low-pressure side).

The ejector 52 supplies the anode gas to the fuel cell stack 12 on the downstream side while sucking in the anode offgas from the anode circulation path 44, using the negative pressure generated by the movement of the anode gas ejected from the injector 50.

One end of the anode discharge path 42 is provided with a gas-liquid separator 54 that separates water contained in the anode offgas (water produced during power generation) from the anode offgas. The anode circulation path 44 is connected to an upper portion of the gas-liquid separator 54, and the anode offgas (gas) of the gas-liquid separator 54 flows out to the anode circulation path 44. One end of a drain path 56 for discharging the separated water is connected to a bottom portion of the gas-liquid separator 54. The drain path 56 is provided with a drain valve 56a that opens and closes the flow path.

Furthermore, the purge path 46 is connected to the drain path 56, and a purge valve 46a that opens and closes the flow path is provided in the purge path 46. The anode system apparatus 14 is not limited to the configuration described above. For example, other auxiliary equipment such as a heat exchanger may be provided in the anode supply path 40. Furthermore, a plurality of the injectors 50 may be provided. Alternatively, a circulation pump that circulates the anode offgas may be provided in the anode circulation path 44.

The cathode system apparatus 16 of the fuel cell system 10 includes a cathode supply path 58 for supplying the cathode gas to the fuel cell stack 12, and a cathode discharge path 60 for discharging the cathode offgas from the fuel cell stack 12. A cathode bypass path 62 that allows the cathode gas in the cathode supply path 58 to flow to the cathode discharge path 60 is connected between the cathode supply path 58 and the cathode discharge path 60.

The cathode supply path 58 is provided with a compressor 64 that compresses atmosphere (air) and supplies the compressed atmosphere to the fuel cell stack 12. Furthermore, the cathode supply path 58 includes a supply-side opening/closing valve 58a on the downstream side of the compressor 64 and the upstream side of the cathode bypass path 62, and also includes a humidifier 66 on the downstream side of the supply-side opening/closing valve 58a.

The humidifier 66 is also provided on the upstream side (fuel cell stack 12 side) of the cathode discharge path 60. The humidifier 66 humidifies the cathode gas in the cathode supply path 58 using the moisture contained in the cathode offgas in the cathode discharge path 60.

The cathode discharge path 60 includes a discharge-side opening/closing valve 60a and a back pressure valve 60b on the downstream side of the humidifier 66. Furthermore, the drain path 56 of the anode system apparatus 14 is connected to the cathode discharge path 60. The cathode bypass path 62 is provided with a flow rate adjusting valve 62a that adjusts the flow rate of the cathode gas flowing therethrough.

The cathode system apparatus 16 is not limited to the configuration described above. For example, other auxiliary equipment such as an intercooler that cools the cathode gas may be provided in the cathode supply path 58. Other auxiliary equipment such as a gas-liquid separator and an expander may be provided in the cathode discharge path 60. Furthermore, a circulation path (including a pump or the like) that circulates the cathode offgas may be provided between the cathode supply path 58 and the cathode discharge path 60.

The cooling apparatus 18 of the fuel cell system 10 includes a coolant supply path 68 for supplying coolant to the fuel cell stack 12, and a coolant discharge path 70 for discharging the coolant from the fuel cell stack 12. The coolant supply path 68 and the coolant discharge path 70 are connected to a radiator 72 that cools the coolant. The coolant supply path 68 is provided with a coolant pump 74 that circulates the coolant between the fuel cell stack 12 and the radiator 72.

Furthermore, the fuel cell system 10 includes a plurality of pressure sensors 76 that detect the pressure of the reactant gas, and a plurality of temperature sensors 78 that detect the temperature of the surrounding environment of the vehicle 11 or the temperature at a prescribed location of the fuel cell system 10. An anode supply-side pressure sensor 76a provided in the anode supply path 40, a cathode supply-side pressure sensor 76b provided in the cathode supply path 58, a cathode discharge-side pressure sensor 76c provided in the cathode discharge path 60, and the like are provided as the pressure sensors 76. An outside temperature sensor 78a that detects the temperature outside the vehicle 11, a coolant outlet temperature sensor 78b provided in the coolant discharge path 70 near the fuel cell stack 12, and the like are provided as the temperature sensors 78.

Figure 2:
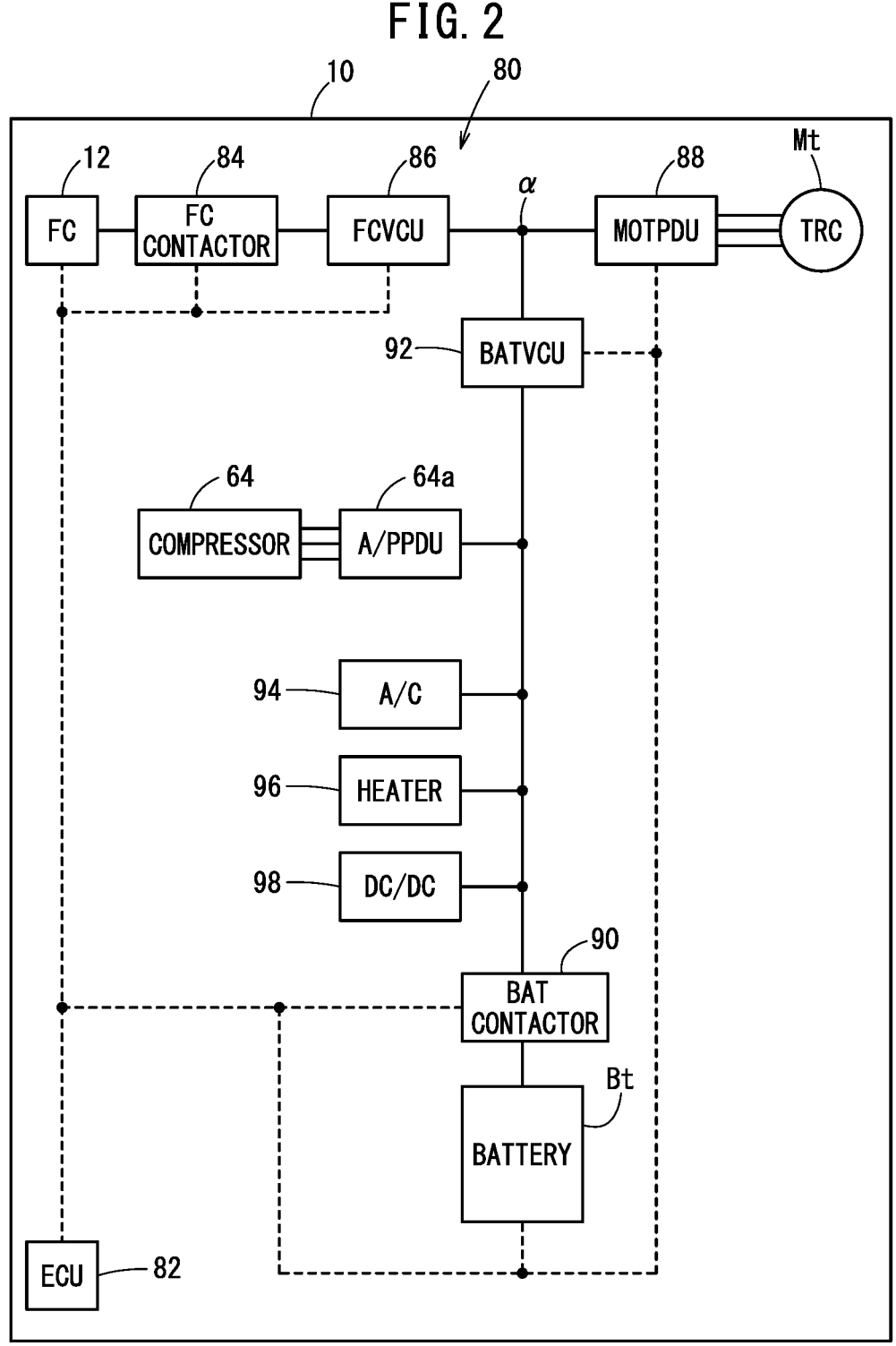
FIG. 2 is a block diagram showing an electrical system of a fuel cell system.

The fuel cell system 10 described above includes a power system 80 that distributes the generated power of the fuel cell stack 12 and an ECU (Electronic Control Unit) 82 that manages the power of the vehicle 11. The power system 80 is configured to supply the power generated by the fuel cell stack 12 to the traction motor Mt and the battery Bt and to supply the regenerative power of the traction motor Mt (and the auxiliary equipment such as the compressor 64) to the battery Bt. The following describes the power system 80, while referencing FIG. 2.

An FC contactor 84, a boost converter 86 (referred to as an FCVCU 86), and an inverter 88 (referred to as a MOTPDU 88) are connected in series in the stated order, from the fuel cell stack 12, between the fuel cell stack 12 (FC) and the traction motor (TRC) Mt.

Furthermore, the battery Bt is connected to the traction motor Mt, via a BAT contactor 90 and a buck/boost converter 92 (referred to as a BATVCU 92). The FCVCU 86 and the BATVCU 92 are connected in parallel to the traction motor Mt at a secondary-side connection point a. Furthermore, a plurality of pieces of auxiliary equipment are connected in parallel to the primary side of the BATVCU 92. Examples of these pieces of auxiliary equipment include the compressor 64 of the cathode system apparatus 16, an air conditioner 94 (referred to as an A/C 94) that controls air conditioning of the vehicle 11, one or more heaters 96 that heat the seats of the vehicle 11 and prescribed pieces of the auxiliary equipment of the fuel cell system 10, and the like. Furthermore, a buck converter 98 (referred to as a DC/DC 98) is connected to the primary side of the BATVCU 92. The DC/DC 98 lowers the power supplied to the auxiliary equipment to a prescribed voltage.

The FC contactor 84 is connected to the ECU 82, and switches between connection and disconnection between the fuel cell stack 12 and the primary side of the FCVCU 86, under the control of the ECU 82.

The FCVCU 86 is a voltage control unit that includes a chopper circuit. The FCVCU 86 is connected to the ECU 82, boosts the voltage on the primary side, and applies this voltage to the secondary side, under the control of the ECU 82.

The MOTPDU 88 is configured as a three-phase bridge, converts the DC voltage on the connection point a (of the FCVCU 86 and the BATVCU 92) side into AC voltage, and controls the driving of the traction motor Mt according to a control signal for a target rotational speed output from the ECU 82. Furthermore, the MOTPDU 88 functions as a forward-conversion converter during the regeneration of the traction motor Mt, and converts the AC voltage generated by the traction motor Mt into DC voltage.

The traction motor Mt is rotationally driven by the three-phase AC power of the MOTPDU 88, and causes the vehicle 11 to move by transmitting this rotational power to the wheels via a transmission and the like (not shown in the drawings). When the vehicle 11 is decelerating or the like, the traction motor Mt serves as a power generator that outputs regenerative power to the battery Bt and the auxiliary equipment.

The battery Bt is configured to be capable of being charged with and discharging power, and discharges an amount of power corresponding to the amount by which the power generation amount of the fuel cell stack 12 is insufficient relative to the actual power consumption of the traction motor Mt and the auxiliary equipment. Furthermore, at a given timing, the battery Bt is charged with an amount of power corresponding to the excess of the power generation amount of the fuel cell stack 12 and the traction motor Mt relative to the actual power consumption. The state of charge (SOC) of the battery Bt is monitored by the ECU 82.

The BAT contactor 90 is connected to the ECU 82, and switches between connection and disconnection between the battery Bt and the primary side of the BATVCU 92, under the control of the ECU 82.

In the same manner as the FCVCU 86, the BATVCU 92 is formed by a voltage control unit that includes a chopper circuit. The BATVCU 92 is connected to the ECU 82 and, under the control of the ECU 82, boosts the primary-side voltage and applies the boosted voltage to the secondary side during powering and drops the secondary-side voltage and applies the dropped voltage to the primary side during regeneration.

The compressor 64 is connected to the primary side of the BATVCU 92, via an air pump PDU 64a (referred to as an A/PPDU 64a). The A/PPDU 64a includes a three-phase bridge inverter, converts the DC voltage on the primary side into AC voltage, and controls driving of the compressor 64 according to the control signal for the target rotational speed output from the ECU 82.

The ECU 82 of the fuel cell system 10 is formed by a computer (including a microcontroller) that includes one or more processors, a memory, and an input/output interface, which are not shown in the drawings. The ECU 82 sequentially controls activation, power generation during operation (power generation performed during operation of the vehicle 11), and a stopping process in a single operation of the fuel cell system 10. Furthermore, during activation, the ECU 82 temporarily disallows travel of the vehicle 11 and implements standby power generation.

During the power generation during operation, the ECU 82 sets a target power generation current value for the fuel cell stack 12, based on a power generation demand command or the like from a motor ECU (not shown in the drawings) that controls the driving state of the traction motor Mt of the vehicle 11. Furthermore, the ECU 82 sets a target power generation voltage value corresponding to the target power generation current value, and adjusts the voltage of the power source line from the fuel cell stack 12 to the MOTPDU 88, via the FCVCU 86.

The ECU 82 then controls the opening/closing of the injector 50 and the like, based on a target supply amount of the anode gas corresponding to the target power generation current value and the anode pressure detected by the anode supply-side pressure sensor 76a, and supplies the fuel cell stack 12 with a suitable amount of the anode gas. Furthermore, the ECU 82 controls the compressor 64, the flow rate adjusting valve 62a, and the like, based on a target supply amount of the cathode gas corresponding to the target power generation current value and the cathode pressure detected by the cathode supply-side pressure sensor 76b and the cathode discharge-side pressure sensor 76c, and supplies the fuel cell stack 12 with a suitable amount of the cathode gas. In this way, the fuel cell stack 12 outputs the power generation current corresponding to the power generation demand command to the power system 80.

Figure 3:
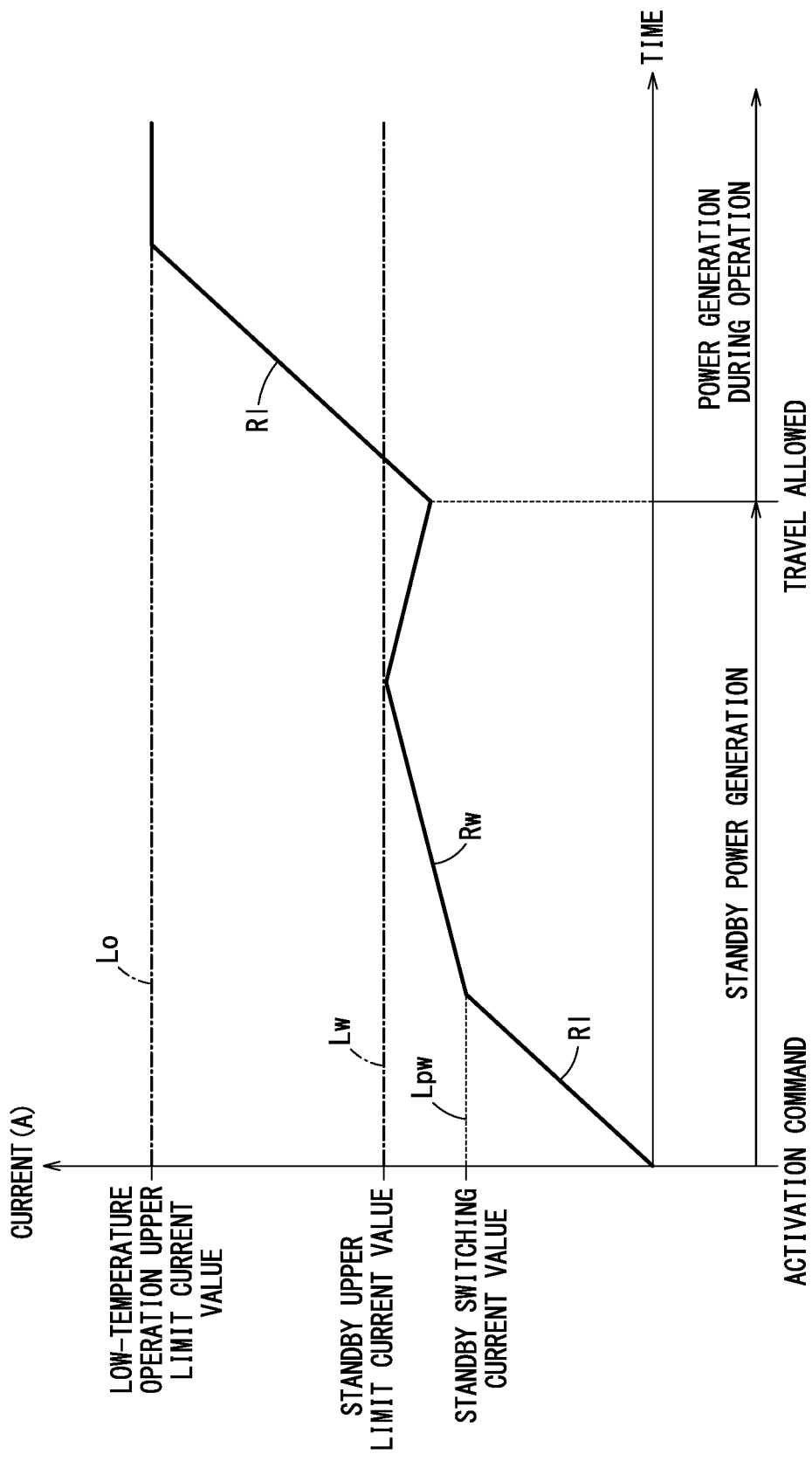
FIG. 3 is a graph showing the power generation current during activation of a fuel cell stack.

Furthermore, as shown in FIG. 3, during the activation of the fuel cell system 10, the ECU 82 charges the battery Bt with the power of the fuel cell stack 12, and controls the power generation of the fuel cell stack 12 based on an upper limit current value (target power generation current value) and a current increase rate that have been set. In particular, when the surrounding environment of the vehicle 11 is at a low temperature (e.g. below the freezing point), the ECU 82 performs control by preparing a plurality of upper limit current values and current increase rates to shorten the implementation time period of the standby power generation while achieving power generation stability.

Specifically, the ECU 82 sets a low-temperature operation upper limit current value Lo and a standby upper limit current value Lw, as upper limit current values for limiting the power generation current of the fuel cell stack 12 when the temperature is low. Furthermore, the ECU 82 sets a standby switching current value Lpw that serves as a switching timing of the current increase rate during the standby power generation.

The low-temperature operation upper limit current value Lo is used for limiting the power generation current of the fuel cell stack 12 in a case where the fuel cell system 10 performs power generation during operation while travel of the vehicle 11 is allowed after the standby power generation. The ECU 82 controls the power generation of the fuel cell system 10 so as to not exceed the low-temperature operation upper limit current value Lo, while complying with the power generation demand command during the initial travel period of the vehicle 11. The low-temperature operation upper limit current value Lo preferably fluctuates according to temperature information such as the temperature of the fuel cell stack 12 and the outside temperature. For example, the ECU 82 may include power-generation-during-operation map information (or a function), not shown in the drawings, which indicates the relationship between the low-temperature operation upper limit current value Lo and the temperature information, and may acquire a suitable low-temperature operation upper limit current value Lo according to the detected outside temperature.

On the other hand, the standby upper limit current value Lw is set during implementation of the standby power generation, and is used for limiting the current of the standby power generation of the fuel cell stack 12. The standby upper limit current value Lw is a lower value than the low-temperature operation upper limit current value Lo, and is set in a range of 30% to 70% of the low-temperature operation upper limit current value Lo, for example. The ECU 82 calculates a maximum chargeable amount from the SOC of the battery Bt that is being monitored by the ECU 82, and calculates the standby upper limit current value Lw that enables suitable charging (restricts wasted power) of the battery Bt based on this maximum chargeable amount and the implementation time period of the standby power generation. During the standby power generation, when the power generation current of the fuel cell stack 12 has increased and reached this standby upper limit current value Lw, the ECU 82 may perform control to gradually lower the power generation current of the fuel cell stack 12.

The standby switching current value Lpw is a value that fluctuates according to the temperature information (e.g. the outside temperature and the coolant outlet temperature), and is set to be lower than the standby upper limit current value Lw below the freezing point. The ECU 82 includes standby map information (or a function), not shown in the drawings, which indicates the relationship between the standby switching current value Lpw and the temperature information, and sets a suitable standby switching current value Lpw according to the detected temperature information.

Figure 4:
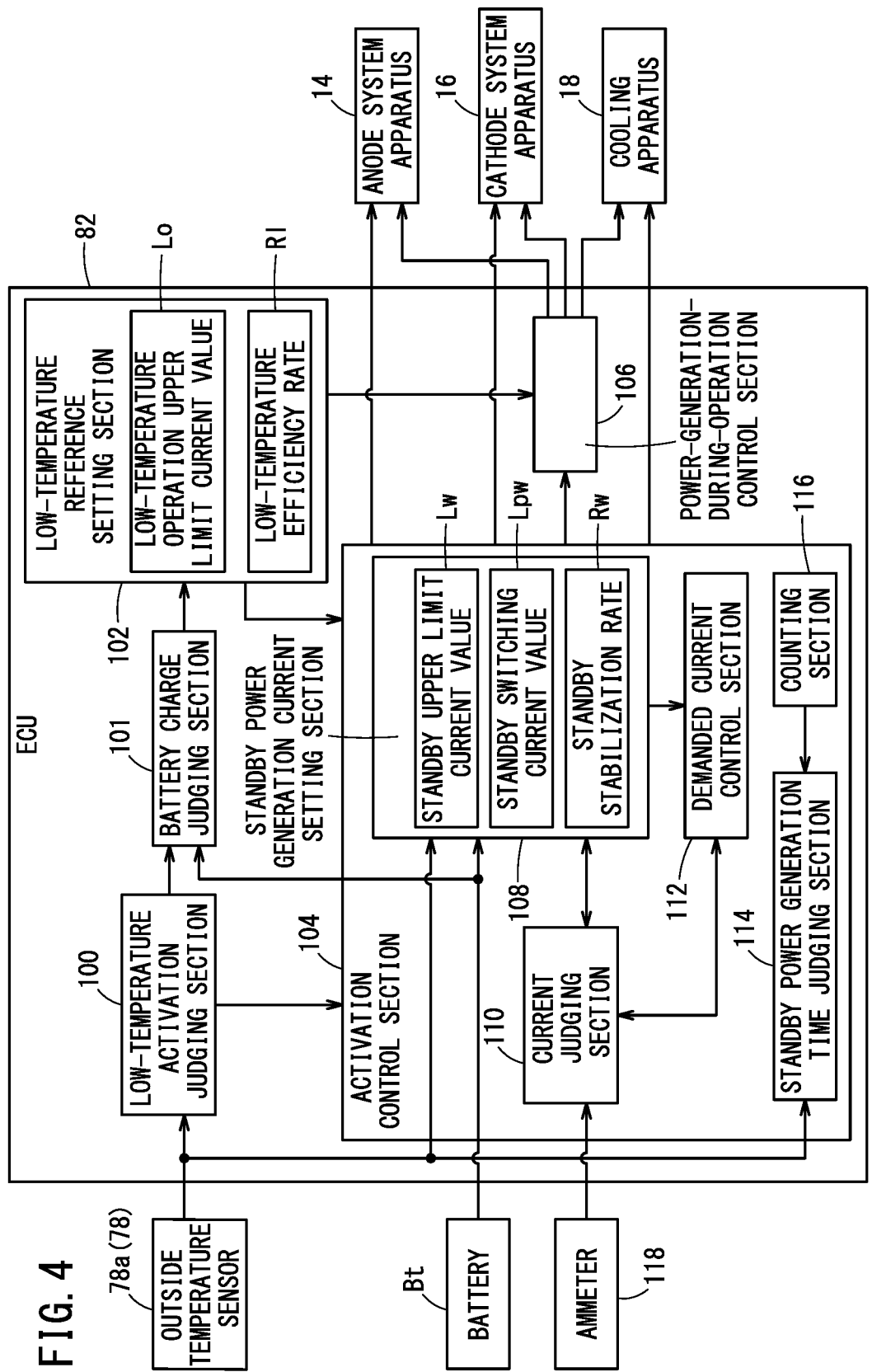
FIG. 4 is a block diagram showing function blocks within an ECU of the fuel cell system.

The ECU 82 sets two types of current increase rates (a low-temperature efficiency rate Rl and a standby stabilization rate Rw) for gradually (linearly) increasing the power generation current of the fuel cell stack 12 over time (see FIG. 4 as well). In FIG. 3, the low-temperature efficiency rate Rl and the standby stabilization rate Rw are indicated by the slope of the power generation current of the fuel cell stack 12. During the standby power generation of the fuel cell stack 12, the ECU 82 sets the target current value and the target voltage value of the FCVCU 86 based on this current increase rate, and changes the supply amounts of the anode gas and the cathode gas according to the current increase rate.

The low-temperature efficiency rate Rl is a first current increase rate for most efficiently increasing the power generation current of the fuel cell stack 12 during the implementation of the activation at a low temperature. Specifically, if the power generation environment (moisture amount, temperature, and the like) of the fuel cell stack 12 is suitable, the ECU 82 supplies the anode gas and the cathode gas in accordance with the low-temperature efficiency rate Rl to cause the fuel cell stack 12 to generate power, thereby making it possible to realize a high output in the shortest time. However, if the fuel cell system 10 increases the power generation current of the fuel cell stack 12 with a greater slope than the low-temperature efficiency rate Rl, the power generation stability of the fuel cell stack 12 drops.

On the other hand, the standby stabilization rate Rw is a rate for increasing the power generation current while stably realizing catalytic activity (in-plane activity of electrodes) of the power generation cells 20, by balancing the reactant gas in the standby power generation with the amount of moisture in the fuel cell stack 12. Accordingly, compared to the low-temperature efficiency rate Rl, the rate (slope) at which the current increases is lower with the standby stabilization rate Rw.

Here, in order to prevent freezing of the electrode surfaces of the power generation cells 20, when it is predicted that the surrounding environment will be at a low temperature during the stopping process, the fuel cell system 10 implements a scavenging process to discharge the moisture from within the fuel cell stack 12. Due to this scavenging process, the area of the electrode surface incapable of power generation due to freezing is reduced, but the amount of moisture in the fuel cell stack 12 during activation is also reduced. Therefore, after a certain time has passed from the activation, the ECU 82 performs control to increase the power generation current in accordance with the standby stabilization rate Rw. In this way, the decrease in power generation stability caused by the rapid increase in the power generation current within the fuel cell stack 12 is suppressed, and a suitable amount of moisture can be obtained for the power generation.

Specifically, during the implementation of the standby power generation, the ECU 82 sets the low-temperature efficiency rate Rl first and then switches to the standby stabilization rate Rw at a prescribed timing (timing at which the power generation current has exceeded the standby switching current value Lpw). Then, from this timing onward in the implementation of the standby power generation, the ECU 82 controls the power generation of the fuel cell stack 12 in accordance with the standby stabilization rate Rw.

In order to implement the operation described above, the ECU 82 creates function blocks such as shown in FIG. 4, by having one or more processors execute a program (not shown in the drawings) stored in a memory. Specifically, a low-temperature activation judging section 100, a battery charge judging section 101, a low-temperature reference setting section 102, an activation control section 104, and a power-generation-during-operation control section 106 are formed within the ECU 82.

The low-temperature activation judging section 100 judges whether to implement low-temperature activation of the fuel cell system 10. The low-temperature activation judging section 100 judges that the low-temperature activation is to be implemented if the temperature information of the outside temperature sensor 78a has dropped below a prescribed temperature threshold value (e.g. 0° C.), and judges that the low-temperature activation is not to be implemented if the temperature information is greater than or equal to the temperature threshold value. A unit for judging the low-temperature activation is not particularly limited, and this judgment may be made based on temperature information of another temperature sensor 78 (e.g. the coolant outlet temperature sensor 78b). Alternatively, the low-temperature activation judging section 100 may judge that the low-temperature activation is to be implemented if the scavenging process was implemented during the previous stop, and may judge that the low-temperature activation is not to be implemented if the scavenging process was not performed.

During activation of the fuel cell system 10, the battery charge judging section 101 judges whether to charge the battery Bt with the power generated during the standby power generation, based on the SOC of the battery Bt. If the battery Bt is to be charged, the ECU 82 performs control to increase the power generation current in accordance with the low-temperature efficiency rate Rl and the standby stabilization rate Rw. This is because, if the battery Bt is not to be charged, anode gas would be needlessly consumed when the current generated during the standby power generation is increased.

The low-temperature reference setting section 102 sets the low-temperature operation upper limit current value Lo defining the upper limit of the power generation current when the temperature is low and the low-temperature efficiency rate Rl defining the degree of the increase of the power generation current, based on the judgement concerning implementation of the low-temperature activation made by the low-temperature activation judging section 100. Specifically, when the temperature is low, the ECU 82 first sets a basic current upper limit value and a basic current increase rate.

The activation control section 104 controls the operation of each configurational element of the anode system apparatus 14, the cathode system apparatus 16, and the cooling apparatus 18 to control the standby power generation of the fuel cell stack 12, based on an activation command of the vehicle 11. A standby power generation current setting section 108, a current judging section 110, a demanded current control section 112, a standby power generation time judging section 114, and a counting section 116 are formed in this activation control section 104.

The standby power generation current setting section 108 sets the standby upper limit current value Lw, the standby switching current value Lpw, and the standby stabilization rate Rw that are set for the standby power generation when the low-temperature activation has been implemented. The standby power generation current setting section 108 first sets the standby upper limit current value Lw based on the SOC of the battery Bt, and then sets the standby switching current value Lpw based on the temperature of the outside temperature sensor 78a. Furthermore, the standby power generation current setting section 108 causes the power generation of the fuel cell stack 12 to be implemented based on the low-temperature efficiency rate Rl during an initial period of start of the standby power generation. Then, if the power generation current has become greater than or equal to the standby switching current value Lpw, the standby power generation current setting section 108 switches from the low-temperature efficiency rate Rl to the standby stabilization rate Rw.

The current judging section 110 monitors the power generation current, based on the current value detected by an ammeter 118 that measures the output current of the fuel cell stack 12. For example, during the initial period of the start of the standby power generation, the current judging section 110 compares the detected current value to the standby switching current value Lpw. Furthermore, as an example, after switching to the standby stabilization rate Rw, the current judging section 110 compares the detected current value to the standby upper limit current value Lw and, if the detected current value has exceeded the standby upper limit current value Lw, transmits information indicating this to the demanded current control section 112.

The demanded current control section 112 controls the anode system apparatus 14, the cathode system apparatus 16, the cooling apparatus 18, and the power system 80, based on the current upper limit value and the current increase rate set by the low-temperature reference setting section 102 and the standby power generation current setting section 108. The demanded current control section 112 may adjust the supply amount of the reactant gas, the output of the fuel cell stack 12, and the circulation velocity of the coolant, by performing feedback of the detection information of an appropriate detecting section (the pressure sensor 76, temperature sensor 78, ammeter 118, or the like) during this control.

Furthermore, the standby power generation time judging section 114 sets the implementation time period of the standby power generation, and judges whether to continue or end the standby power generation by comparing this implementation time period to a count time. This implementation time period is configured to fluctuate according to suitable temperature information. For example, the standby power generation time judging section 114 includes in advance an implementation time period map (not shown in the drawings) indicating the relationship between the temperature information and the implementation time period, and extracts a suitable implementation time period based on the temperature information of the temperature sensor 78 (e.g. the outside temperature sensor 78a) during activation. As an example, the implementation time period is set to 20 seconds when the outside temperature is −10° C., and the implementation time period is set to 0 seconds when the outside temperature is 0° C. Furthermore, the counting section 116 measures the time from the start of the standby power generation (activation command), and provides the standby power generation time judging section 114 with the count time.

The power-generation-during-operation control section 106 of the ECU 82 controls the operation of power generation of the fuel cell system 10 (power generation during operation) after the standby power generation ends (after travel has been allowed). For example, the power-generation-during-operation control section 106 performs control to increase the power generation current of the fuel cell stack 12 in accordance with the low-temperature efficiency rate Rl during an initial period of the power generation during operation, and to cause the power generation current to become constant near the low-temperature operation upper limit current value Lo (to be less than or equal to the low-temperature operation upper limit current value Lo).

After travel has been allowed, the power-generation-during-operation control section 106 may continue to monitor the SOC of the battery Bt and continue the charging if there is remaining chargeable capacity in the battery Bt and the target power generation current value based on the power generation demand command is small. In this way, the power used for the travel of the vehicle 11 (during a high load, such as during acceleration) is ensured more reliably.

The fuel cell vehicle 11 (vehicle 11) according to the present embodiment is basically configured as described above, and the following describes the operation (activation method) thereof.

The vehicle 11 outputs an activation command to the ECU 82 of the fuel cell system 10, based on an activation manipulation made by the user while in the stopped state (an ON manipulation of an ignition or starter switch, an activation communication from the user, or the like). The ECU 82 creates the function blocks shown in FIG. 4 in accordance with the activation, and performs the process flow (activation method) shown in FIG. 5 according to the operations of the appropriate function sections.

The ECU 82 first judges whether to implement the low-temperature activation using the low-temperature activation judging section 100 (step S10). If the low-temperature activation judging section 100 judges that the low-temperature activation is not to be implemented (step S10: NO), the process moves to step S11, and the normal activation control is implemented at step S11. On the other hand, if the low-temperature activation judging section 100 judges that the low-temperature activation is to be implemented (step S10: YES), the process moves to step S12.

At step S12, the ECU 82 acquires the SOC of the battery Bt and judges whether the battery Bt is chargeable with the power from the standby power generation (or makes this judgment based on whether there is a demand for charging of the battery Bt). If charging is impossible (there is no demand for charging) (step S12: NO), the process moves to step S11, and if charging is possible (step S12: YES), the process moves to step S13.

At step S13, the ECU 82 sets the low-temperature operation upper limit current value Lo and the low-temperature efficiency rate Rl using the low-temperature reference setting section 102. Furthermore, the ECU 82 sets the standby upper limit current value Lw and the standby switching current value Lpw using the standby power generation current setting section 108 (step S14).

After this, the demanded current control section 112 controls the fuel cell system 10 to perform the standby power generation, based on the low-temperature efficiency rate Rl (step S15). At this time, the ECU 82 charges the battery Bt with the power of the fuel cell stack 12, by setting a connected state within the BAT contactor 90 and the FC contactor 84 of the power system 80. The ECU 82 may supply a portion of the power of the fuel cell stack 12 to other pieces of auxiliary equipment (the compressor 64 and the like).

During the standby power generation, the current judging section 110 compares the current value detected by the ammeter 118 to the standby switching current value Lpw, and judges whether the detected current value has exceeded the standby switching current value Lpw (step S16). If the detected current value is less than or equal to the standby switching current value Lpw (step S16: NO), the process returns to step S15 and the standby power generation continues. On the other hand, if the detected current value is greater than the standby switching current value Lpw (step S16: YES), the process moves to step S17.

At step S17, the standby power generation current setting section 108 changes (switches) the setting for the current increase rate from the low-temperature efficiency rate Rl to the standby stabilization rate Rw.

The demanded current control section 112 then controls the fuel cell system 10 based on the standby stabilization rate Rw to continue the standby power generation (step S18).

Furthermore, using the standby power generation time judging section 114, the ECU 82 compares the implementation time period of the standby power generation set based on the temperature during activation and the count time of the counting section 116, and judges whether the count time has reached the implementation time period (step S19). If the count time has not reached the implementation time period (step S19: NO), the process moves to step S18 and the standby power generation continues. On the other hand, if the count time has reached the implementation time period (step S19: YES), the process moves to step S20.

At step S20, the ECU 82 removes the standby upper limit current value Lw and the standby stabilization rate Rw using the standby power generation current setting section 108, ends the standby power generation, and transitions to the power generation during operation. Specifically, the vehicle 11 switches from a travel-disallowed state to a travel-allowed state, and travels while implementing the power generation during operation with the fuel cell system 10.

During the power generation during operation, the power-generation-during-operation control section 106 of the ECU 82 controls the fuel cell system 10 based on the low-temperature operation upper limit current value Lo and the low-temperature efficiency rate Rl. Then, when the vehicle 11 has accelerated significantly, for example, the amount of power that is lacking is compensated for by the charged power of the battery Bt, while the power generation current of the fuel cell stack 12 is being restricted by the low-temperature operation upper limit current value Lo. Accordingly, it is possible to comfortably accelerate the vehicle 11.

The following describes the operation of each configurational element of the fuel cell system 10 and the change of the power generation current based on the activation method described above, while referencing the time chart of FIG. 6.

At a timing t0, the vehicle 11 transmits the activation command to the fuel cell system 10. Due to this, the ECU 82 controls the operation of the fuel cell system 10 to start the standby power generation. At the start of this standby power generation, the ECU 82 sets the low-temperature efficiency rate Rl as the current increase rate (in FIG. 6, the current increase rate is set to 1 in the state management thereof). In a state where this low-temperature efficiency rate Rl is set, the compressor 64 increases the cathode gas supply amount over time, under the control of the ECU 82. The coolant pump 74 raises its rotational speed to obtain a flow velocity corresponding to the low-temperature efficiency rate Rl and circulates the coolant, under the control of the ECU 82.

In this way, the power generation current of the fuel cell stack 12 increases in accordance with the low-temperature efficiency rate Rl, and the battery Bt is charged with this power generation current. Due to this power generation during the initial period of the start of the standby power generation, the temperature of the fuel cell stack 12 increases gradually and the amount of moisture in the fuel cell stack 12 also increases gradually. Then, as described above, the ECU 82 continues this power generation state until the power generation current of the fuel cell stack 12 (current value detected by the ammeter 118) reaches the standby switching current value Lpw.

At a timing t1, at which the power generation current has exceeded the standby switching current value Lpw, the ECU 82 sets the standby stabilization rate Rw as the current increase rate (in FIG. 6, the current increase rate is set to 2 in the state management thereof). The compressor 64 increases the cathode gas supply amount with an increase rate that is lower than the increase rate of the cathode gas supply amount from the timing t0 to the timing t1, in accordance with the standby stabilization rate Rw, under the control of the ECU 82. Similarly, the coolant pump 74 gradually increases the flow velocity (rotational speed) in accordance with the standby stabilization rate Rw, under the control of the ECU 82.

In this way, the power generation current of the fuel cell stack 12 increases in accordance with the standby stabilization rate Rw, and the battery Bt is charged with this power generation current. During the power generation from the timing t1 and onward, the fuel cell stack 12 is warmed up, the temperature thereof increases, and the amount of moisture therein gradually increases.

Here, control of a comparative example in which the charging of the battery Bt is not implemented during the standby power generation will be described. With the control of this comparative example, since the charging of the battery Bt is not performed, the power generation of the fuel cell stack 12 is not increased and a low power generation current continues to be output during the standby power generation, as shown by the two-dot chain line in FIG. 6. This is because the amount of anode gas corresponding to the power generation of the fuel cell stack 12 is consumed, and this causes a worsening of the fuel efficiency. Therefore, with the control of the comparative example, the temperature increase of the fuel cell stack 12 is slower than the temperature increase of the fuel cell stack 12 realized by the control of the present embodiment (control for charging the battery Bt). Furthermore, with the control of the comparative example, the increase of the amount of moisture within the fuel cell stack 12 is slower than the increase of the amount of moisture realized by the control of the present embodiment. Accordingly, with the control of the comparative example, the implementation time period of the standby power generation performed from the timing t1 and onward becomes significantly longer. In FIG. 6, an example is shown in which travel is allowed with the control of the comparative example at a timing t3, which is the same timing at which travel is allowed in the present embodiment, but the actual control is performed such that the standby power generation continues without allowing travel until the fuel cell stack 12 reaches a temperature at which the power generation is stable.

On the other hand, with the control of the present embodiment, by stably increasing the power generation current of the fuel cell stack 12, the increase of the temperature of the fuel cell stack 12 and the increase of the amount of moisture in the fuel cell stack 12 become faster, and the implementation time period of the standby power generation becomes shorter. Furthermore, there is no unnecessary consumption of anode gas due to charging the battery Bt during the standby power generation.

From a timing t2, at which the power generation current becomes greater than or equal to the standby upper limit current value Lw, the ECU 82 performs a process to reduce the power generation current. The standby upper limit current value Lw is set based on the SOC of the battery Bt. Therefore, when the power generation current has become greater than or equal to the standby upper limit current value Lw, the SOC of the battery Bt can be said to have become high, and the time period from the timing t2 to the timing t3 at which the standby power generation ends is short. Therefore, from the timing t2, restriction of the consumption of anode gas is prioritized by reducing the power generation current of the fuel cell stack 12. Even when control is performed to restrict the power generation amount of the fuel cell stack 12, the temperature of the fuel cell stack 12 and the amount of moisture inside the fuel cell stack 12 can be increased.

The vehicle 11 then allows travel of the vehicle 11 at the timing t3, at which the implementation time period of the standby power generation ends. At this time, the ECU 82 again switches the setting for the current increase rate from the standby stabilization rate Rw to the low-temperature efficiency rate Rl (in FIG. 6, the current increase rate is set to 1 in the state management thereof). Therefore, from the timing t3, the compressor 64 increases the cathode gas supply amount in accordance with the low-temperature efficiency rate Rl and adjusts the cathode gas supply amount such that the power generation during operation becomes constant near the low-temperature operation upper limit current value Lo. Similarly, the coolant pump 74 increases the flow velocity (rotational speed) in accordance with the low-temperature efficiency rate Rl, and adjusts the flow velocity such that power generation during operation becomes constant near the low-temperature operation upper limit current value Lo.

By the amount of moisture inside the fuel cell stack 12 reaching a target moisture amount Wt during the standby power generation, the fuel cell stack 12 can perform the power generation stably during the power generation during operation and shorten the time period during which the power generation current increases. In contrast to this, with the control of the comparative example, even after travel is allowed, the movement efficiency of the hydrogen ions is lowered due to there being only a small amount of moisture in the fuel cell stack 12. When the temperature of the fuel cell stack 12 is low, the in-plane activity of the electrodes remains insufficient. Therefore, with the control of the comparative example, the power generation during operation becomes unstable, and the power generation current fluctuates violently.

The present invention is not limited to the embodiment described above, and various alterations can be made within the scope of the invention. The control of the present embodiment using the low-temperature efficiency rate Rl and the standby stabilization rate Rw may be performed not only during implementation of the low-power activation, but also in other states. For example, when the inside of the fuel cell stack 12 is in a dry state, the vehicle 11 may activate the fuel cell system 10 by performing the same control (activation method).

The ECU 82 may set the low-temperature operation upper limit current value Lo, the standby upper limit current value Lw, the standby switching current value Lpw, and the like as needed. For example, when the SOC of the battery Bt is low, the increase of the power generation current in accordance with the standby stabilization rate Rw may be continued, without setting the standby upper limit current value Lw. Furthermore, as an example, it is difficult to lower the temperature of the fuel cell stack 12 during the power generation during operation if the temperature is near the freezing point, and therefore the power generation current may be increased without setting the low-temperature operation upper limit current value Lo.

The following describes the technical concepts and effects that can be understood from the embodiments described above.

A first aspect of the present invention is a fuel cell vehicle 11 mounted with a fuel cell system 10 including a fuel cell stack 12 and a battery Bt that is charged with power generated by the fuel cell stack 12, the fuel cell vehicle 11 travelling using power of the fuel cell stack 12 and the battery Bt, and comprising a control section (ECU 82) that, when a surrounding environment is at a low temperature, controls operation of the fuel cell system 10 prior to travelling, to perform standby power generation from activation to when travel is allowed and to perform power generation during operation of the fuel cell vehicle after travel has been allowed, wherein, during the power generation during operation, the control section increases a power generation current of the fuel cell stack 12 in accordance with a first current increase rate (low-temperature efficiency rate Rl), and during the standby power generation, the control section causes the battery Bt to be charged with the power generated by the fuel cell stack 12 and, when the power generation current of the fuel cell stack 12 exceeds a standby switching current value Lpw set based on temperature information, the control section switches the first current increase rate to a second current increase rate (standby stabilization rate Rw) that is a lower increase rate than the first current increase rate and increases the power generation current of the fuel cell stack 12 in accordance with the second current increase rate.

During the standby power generation, the fuel cell vehicle 11 controls the power generation of the fuel cell stack 12 in accordance with the second current increase rate (standby stabilization rate Rw) that is a lower increase rate than the first current increase rate (low-temperature efficiency rate Rl). Therefore, it is possible to charge the battery Bt with the power generation current while achieving power generation stability. In other words, according to the supply amount of the reactant gas in accordance with the second current increase rate, it is possible to stably increase the power generation current while maintaining a balance with the amount of moisture inside the fuel cell stack 12, and to quickly escape from a temperature range in which the in-plane activity of the electrode surfaces is unstable by the temperature increase caused by power generation. As a result, the fuel cell vehicle 11 can significantly shorten the implementation time period of the standby power generation. Furthermore, since the charging amount of the battery Bt is increased during the standby power generation, the fuel cell vehicle 11 can reduce the output power of the fuel cell stack 12 even after travel is allowed, and can maintain good power generation stability.

During activation of the fuel cell system 10, the control section (ECU 82) judges whether to implement low-temperature activation that is performed in a state where the surrounding environment is at a low temperature, and performs control in accordance with the first current increase rate (low-temperature efficiency rate Rl) and the second current increase rate (standby stabilization rate Rw) according to the judgment concerning whether to implement the low-temperature activation. By performing control in accordance with the first and second current increase rates during the low-temperature activation in which the in-plane activity of the electrode surfaces is low, the fuel cell vehicle 11 can more smoothly increase the temperature of the fuel cell stack 12 that is in a low-temperature state.

During the activation of the fuel cell system 10, the control section (ECU 82) acquires a state of charge of the battery Bt and judges whether to perform the control in accordance with the first current increase rate (low-temperature efficiency rate Rl) and the second current increase rate (standby stabilization rate Rw) based on the state of charge. In this way, the fuel cell vehicle 11 can reliably charge the battery Bt with the power from the standby power generation of the fuel cell stack 12, and can more strongly restrict the worsening of the fuel efficiency.

The control section (ECU 82) increases the power generation current of the fuel cell stack 12 in accordance with the first current increase rate (low-temperature efficiency rate Rl), from immediately after the start of the standby power generation to when the power generation current of the fuel cell stack 12 exceeds the standby switching current value Lpw. In this way, the fuel cell vehicle 11 can save time by using the first current increase rate during a time period in which it is not a problem for the power generation current of the fuel cell stack 12 to increase in a short time immediately after the start of the standby power generation, and can achieve power generation stability by using the second current increase rate thereafter.

The control section (ECU 82) includes a standby map information indicating a relationship between the temperature information and the standby switching current value Lpw, and references the standby map information during activation of the fuel cell system 10 to set the standby switching current value Lpw based on the acquired temperature information. In this way, it is possible to suitably set the timing of the switching from the first current increase rate (low-temperature efficiency rate Rl) to the second current increase rate (standby stabilization rate Rw) according to the standby switching current value Lpw that is based on the temperature information.

The control section (ECU 82) sets a standby upper limit current value Lw that is an upper limit of the power generation current of the fuel cell stack 12 during the standby power generation, based on a state of charge of the battery Bt, and performs control such that the power generation current of the fuel cell stack 12 becomes less than or equal to the standby upper limit current value Lw. The fuel cell vehicle 11 can reliably charge the battery Bt with power by performing the standby power generation such that the power generation current becomes less than or equal to the standby upper limit current value Lw set according to the state of charge of the battery Bt.

The control section (ECU 82) implements control to increase the power generation current of the fuel cell stack 12 in accordance with the second current increase rate (standby stabilization rate Rw), until the power generation current exceeds the standby upper limit current value Lw. In this way, the fuel cell vehicle 11 can increase the temperature of the fuel cell stack 12 by more stably continuing the standby power generation.

The control section (ECU 82) sets an operation upper limit current value (low-temperature operation upper limit current value Lo) that is an upper limit of the power generation current during the power generation during operation, and restricts the power generation current of the fuel cell stack 12 to be less than or equal to the operation upper limit current value. During the power generation during operation, the power generation becomes unstable due to the generated water (moisture amount) inside the fuel cell stack 12 increasing as the power generation current, but the fuel cell vehicle 11 can favorably ensure the power generation stability by setting the operation upper limit current value to restrict the power generation current of the fuel cell stack 12.

During activation of the fuel cell system 10, the control section (ECU 82) sets an implementation time period of the standby power generation, based on the temperature information that has been acquired, and transitions to the power generation during operation when a count time surpasses the implementation time period of the standby power generation. By implementing the standby power generation during the implementation time period that is based on the temperature information, the fuel cell vehicle 11 can increase the ease-of-use for the user by avoiding lengthening of the standby power generation. Furthermore, since the battery Bt is charged with the power from the standby power generation, it is possible to favorably compensate for the lack of power during the power generation during operation even after the standby power generation ends.

A second aspect of the present invention is an activation method of a fuel cell vehicle 11 mounted with a fuel cell system 10 including a fuel cell stack 12 and a battery Bt that is charged with power generated by the fuel cell stack 12, the fuel cell vehicle 11 travelling using power of the fuel cell stack 12 and the battery Bt, and being configured to, when a surrounding environment is at a low temperature, control operation of the fuel cell system 10 with a control section (ECU 82) prior to travelling, to perform standby power generation from activation to when travel is allowed and to perform power generation during operation of the fuel cell vehicle after travel has been allowed, the activation method comprising: during the power generation during operation, increasing a power generation current of the fuel cell stack 12 in accordance with a first current increase rate (low-temperature efficiency rate Rl); and during the standby power generation, charging the battery Bt with the power generated by the fuel cell stack 12 and, when the power generation current of the fuel cell stack 12 exceeds a standby switching current value Lpw set based on temperature information, switching the first current increase rate to a second current increase rate (standby stabilization rate Rw) that is a lower increase rate than the first current increase rate and increasing the power generation current of the fuel cell stack 12 in accordance with the second current increase rate. In this way, with the activation method of the fuel cell vehicle 11, it is possible to significantly shorten the standby time period during activation while achieving power generation stability of the fuel cell system 10 with a simple configuration.

What is claimed is:
1. A fuel cell vehicle mounted with a fuel cell system including a fuel cell stack and a battery that is charged with power generated by the fuel cell stack, the fuel cell vehicle travelling using power of the fuel cell stack and the battery, and comprising:
   a control section configured to, when a surrounding environment is at a low ambient temperature, control operation of the fuel cell system prior to travelling, to perform a standby power generation from activation to when travel is allowed, and to perform a power generation during operation of the fuel cell vehicle after travel has been allowed, wherein:

the control section includes one or more processors;
during the power generation during operation, the one or more processors increase a power generation current of the fuel cell stack in accordance with a first current increase rate; and
during the standby power generation, the one or more processors cause the battery to be charged with the power generated by the fuel cell stack and, when the power generation current of the fuel cell stack exceeds a standby switching current value set based on temperature information including at least one of the ambient temperature and a temperature of the fuel cell stack, the one or more processors switch the first current increase rate to a second current increase rate that is a lower increase rate than the first current increase rate and increase the power generation current of the fuel cell stack in accordance with the second current increase rate.

2. The fuel cell vehicle according to claim 1, wherein during activation of the fuel cell system, the one or more processors judge whether to implement low-temperature activation that is performed in a state where the surrounding environment is at a low ambient temperature, and perform control in accordance with the first current increase rate and the second current increase rate according to the judgment concerning whether to implement the low-temperature activation.

3. The fuel cell vehicle according to claim 1, wherein during activation of the fuel cell system, the one or more processors acquire a state of charge of the battery and judge whether to perform control in accordance with the first current increase rate or the second current increase rate, based on the state of charge.

4. The fuel cell vehicle according to claim 1, wherein the one or more processors increase the power generation current of the fuel cell stack in accordance with the first current increase rate, from immediately after start of the standby power generation to when the power generation current of the fuel cell stack exceeds the standby switching current value.

5. The fuel cell vehicle according to claim 1, wherein the one or more processors include standby map information indicating a relationship between the temperature information and the standby switching current value, and reference the standby map information during activation of the fuel cell system to set the standby switching current value based on the acquired temperature information.

6. The fuel cell vehicle according to claim 1, wherein the one or more processors set a standby upper limit current value that is an upper limit of the power generation current of the fuel cell stack during the standby power generation, based on a state of charge of the battery, and perform control such that the power generation current of the fuel cell stack becomes less than or equal to the standby upper limit current value.

7. The fuel cell vehicle according to claim 6, wherein the one or more processors implement control to increase the power generation current of the fuel cell stack in accordance with the second current increase rate, until the power generation current exceeds the standby upper limit current value.

8. The fuel cell vehicle according to claim 1, wherein the one or more processors set an operation upper limit current value that is an upper limit of the power generation current during the power generation during operation, and restrict the power generation current of the fuel cell stack to be less than or equal to the operation upper limit current value.

9. The fuel cell vehicle according to claim 1, wherein during activation of the fuel cell system, the one or more processors set an implementation time period of the standby power generation, based on the temperature information that has been acquired, and transition to the power generation during operation when a count time surpasses the implementation time period of the standby power generation.

10. An activation method of a fuel cell vehicle mounted with a fuel cell system including a fuel cell stack and a battery that is charged with power generated by the fuel cell stack, the fuel cell vehicle travelling using power of the fuel cell stack and the battery, and being configured to, when a surrounding environment is at a low ambient temperature, control operation of the fuel cell system with a control section prior to travelling, to perform standby power generation from activation to when travel is allowed and to perform power generation during operation of the fuel cell vehicle after travel has been allowed, the activation method comprising:
during the power generation during operation, increasing a power generation current of the fuel cell stack in accordance with a first current increase rate; and
during the standby power generation, charging the battery with the power generated by the fuel cell stack and, when the power generation current of the fuel cell stack exceeds a standby switching current value set based on temperature information including at least one of the ambient temperature and a temperature of the fuel cell stack, switching the first current increase rate to a second current increase rate that is a lower increase rate than the first current increase rate and increasing the power generation current of the fuel cell stack in accordance with the second current increase rate.

11. The fuel cell vehicle according to claim 1, wherein the surrounding environment is determined to be at a low temperature on a basis of the ambient temperature outside the fuel cell vehicle or a temperature detected by a temperature sensor provided in a flow channel of the fuel cell system.

12. The activation method according to claim 10, wherein the surrounding environment is determined to be at a low temperature on a basis of the ambient temperature outside the fuel cell vehicle or a temperature detected by a temperature sensor provided in a flow channel of the fuel cell system.

13. A fuel cell vehicle mounted with a fuel cell system including a fuel cell stack and a battery that is charged with power generated by the fuel cell stack, the fuel cell vehicle travelling using power of the fuel cell stack and the battery, and comprising:
a control section configured to, when a surrounding environment is at a low ambient temperature, control operation of the fuel cell system prior to travelling, to perform a standby power generation from activation to when travel is allowed, and to perform a power generation during operation of the fuel cell vehicle after travel has been allowed, wherein:
the control section includes one or more processors;
during the power generation during operation, the one or more processors increase a power generation current of the fuel cell stack in accordance with a first current increase rate; and
during the standby power generation, the one or more processors cause the battery to be charged with the power generated by the fuel cell stack and, when the power generation current of the fuel cell stack exceeds a standby switching current value set based on temperature information including at least one of the ambient temperature and a coolant outlet temperature, the one or more processors switch the first current increase rate to a second current increase rate that is a lower increase rate than the first current increase rate and increase the power generation current of the fuel cell stack in accordance with the second current increase rate.

* * * * *